Nov. 21, 1950 — M. H. VOIGTRITTER — 2,531,347

MERCHANDISE DISPENSING APPARATUS

Filed Feb. 11, 1946 — 6 Sheets-Sheet 1

INVENTOR.
Max Hermann Voigtritter
BY John F. Eakins.
ATTORNEY

Nov. 21, 1950     M. H. VOIGTRITTER     2,531,347
MERCHANDISE DISPENSING APPARATUS
Filed Feb. 11, 1946     6 Sheets-Sheet 2

INVENTOR.
Max Hermann Voigtritter
BY John F. Eakins
ATTORNEY

Nov. 21, 1950  M. H. VOIGTRITTER  2,531,347
MERCHANDISE DISPENSING APPARATUS
Filed Feb. 11, 1946  6 Sheets-Sheet 3
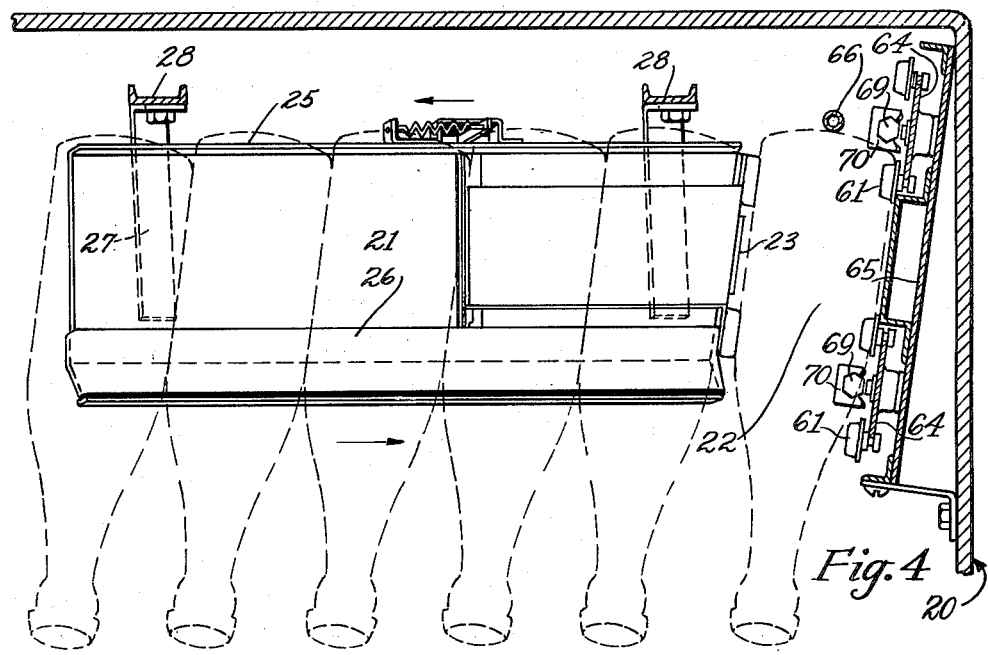
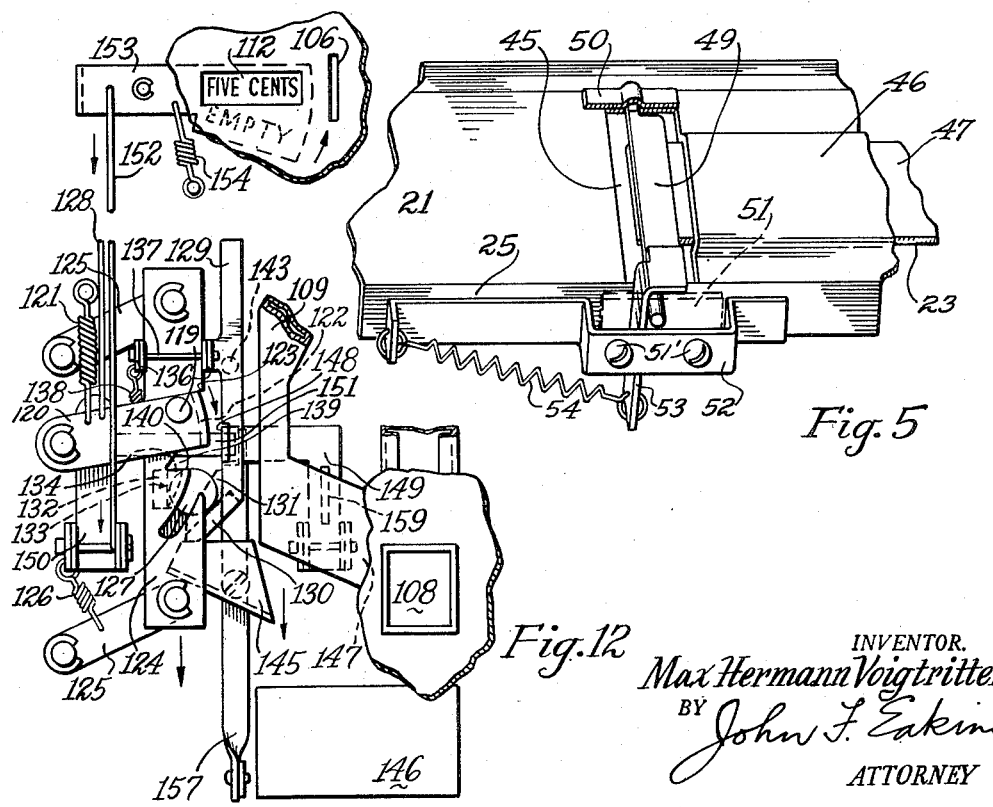
INVENTOR.
Max Hermann Voigtritter
BY John F. Eakins
ATTORNEY

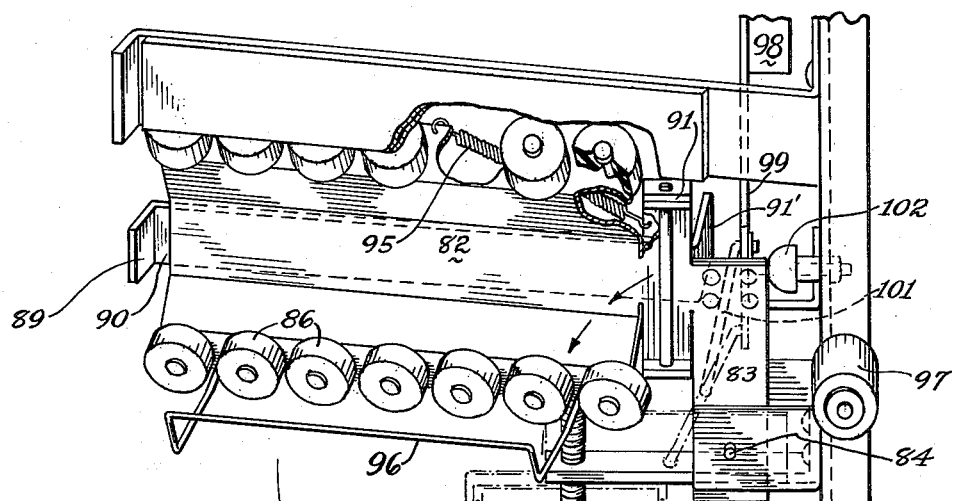
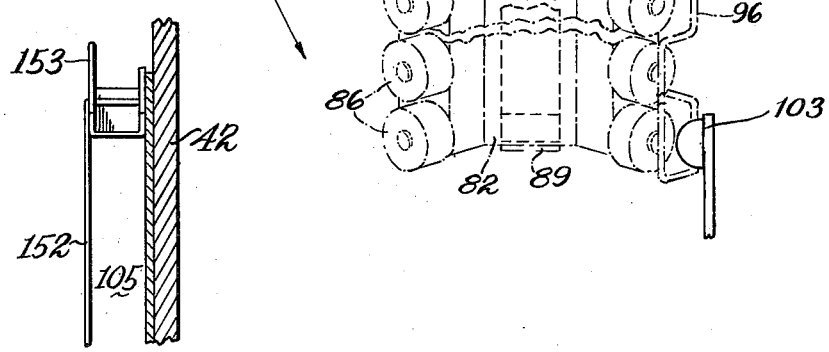
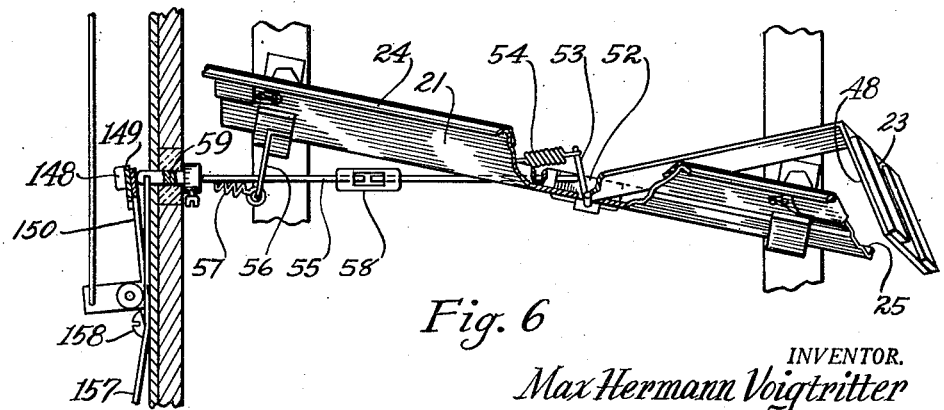

Nov. 21, 1950 — M. H. VOIGTRITTER — 2,531,347
MERCHANDISE DISPENSING APPARATUS
Filed Feb. 11, 1946 — 6 Sheets-Sheet 5
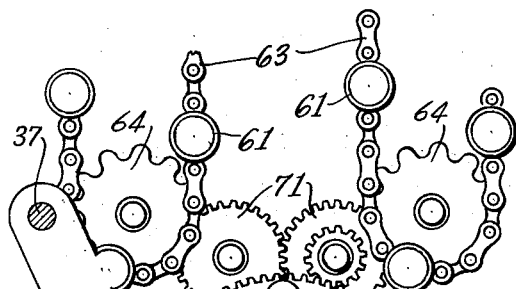
Fig. 7
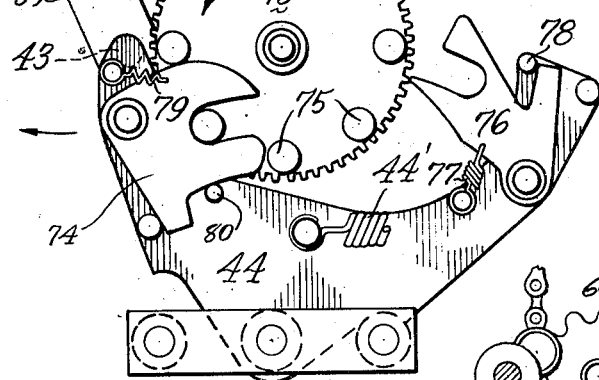
Fig. 8
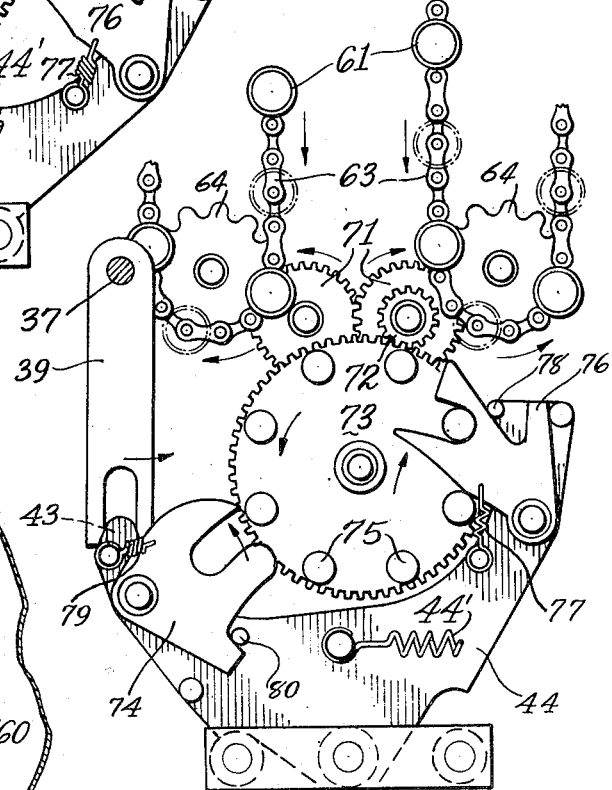
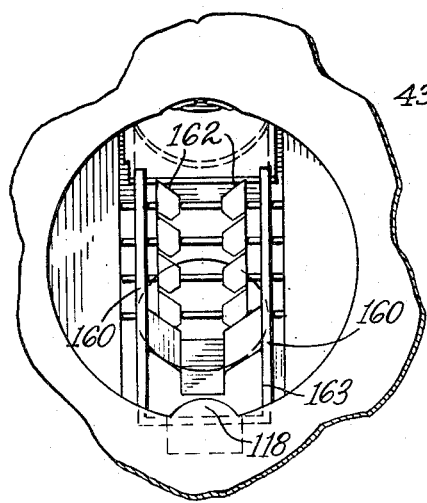
Fig. 10
INVENTOR.
Max Hermann Voigtritter
BY John F. Eakin
ATTORNEY Nov. 21, 1950 M. H. VOIGTRITTER 2,531,347
MERCHANDISE DISPENSING APPARATUS
Filed Feb. 11, 1946 6 Sheets-Sheet 6

INVENTOR.
Max Hermann Voigtritter
BY John F. Eakins
ATTORNEY

Patented Nov. 21, 1950

2,531,347

UNITED STATES PATENT OFFICE 2,531,347

MERCHANDISE DISPENSING APPARATUS

Max Hermann Voigtritter, Chicago, Ill., assignor to J. P. Seeburg Corporation, Chicago, Ill., a corporation of Illinois Application February 11, 1946, Serial No. 646,861

4 Claims. (Cl. 312—48)

This invention relates to merchandise dispensing apparatus for dispensing packages which are round and able to roll. The present apparatus is primarily intended for dispensing bottles containing beverages but it is adapted for dispensing cans and other round packages.

The present apparatus comprises a series of superimposed spaced shelves, each of which is intended to receive a number of bottles. The shelves slope downwardly so that the bottles may roll down the shelves to a vertical channel through which they move downwardly to the dispensing opening. At the lower end of each shelf except the topmost shelf is provided a gate which prevents discharge of the bottles from the shelf until the gate is opened. The gate for each shelf is mounted to open into the vertical channel so that it is held closed by bottles in the channel. When the bottles in the channel are dispensed so that no bottle is opposite a gate, that gate opens allowing the bottles which it was holding back to feed into the vertical channel. Preferably, the gate for each shelf is arranged so that one or more bottles on the next superior shelf holds the gate closed. Considerable difficulty has been experienced with bottle dispensers of this type because the pressure of the bottles on a shelf tends to open its gate. This difficulty is obviated to a considerable extent by using the pressure of one or more bottles on a shelf to hold the gate below that shelf closed. But the difficulty still remains when the last bottle on a shelf is discharged. The pressure of the bottles on the next shelf tends to open its gate somewhat tending to jam this last bottle in the channel. When this occurs, the operation of discharging the bottles from the shelves is prevented. It is one of the principal objects of the present invention to provide means whereby this disadvantage is completely eradicated and continued operation of the machine is insured until all the bottles are dispensed.

A further object of the invention is to provide an improved shelf to insure more satisfactory rolling of the bottles down the shelf, step by step as bottles pass into the channel. For this purpose, I have sloped the shelves in their transverse direction as well as in their longitudinal direction and I have provided an abutment at the low side of the shelf against which the base of the bottle tends to abut. This abutment may suitably be a flange upturned from the shelf along its low side. The friction of the base of the bottle against this abutment tends to retard the free rolling of that end of the bottle downwardly along the shelf. My machine is so arranged that the natural rolling movement of a bottle on the shelf tends to roll the base away from the abutment so that the frictional engagement with the abutment is substantially reduced. To attain this result, the bottles are located on the shelves with a slight obliquity to the transverse direction of the shelf and I insure the slightly oblique position of the bottles on the shelf by locating the gate in similar oblique relation to the transverse direction of the shelf.

I have also found that correct rolling movement of the bottle down a shelf can be enhanced by increasing the friction between the bottle and the shelf at the upper side of the shelf. I prefer to provide along the upper side of the shelf a strip of rubber or other suitable material which has greater friction than the metal of which the shelf is made. When a bottle moves down a shelf one space the next bottle is free to roll downwardly a short distance. Owing to the frictional engagement at the upper side of the shelf, rolling of the bottle is insured and the bottle tends to roll outwardly away from the abutment but its weight tends to move the bottle into engagement with the abutment. However, the friction at the base of the bottle is substantially reduced so that the bottle moves longitudinally down the shelf and any slight deviation from its normally oblique relation to the shelf is corrected when it engages the next arrested bottle.

In known bottle vendors of this general type, the bottles in the vertical channel rested upon each other, and the pressure between the bottles particularly at the lower end of the channel was considerable. The movement of the bottles is accompanied by relative movement between contacting bottles with the result that the bottles wore, and considerable amounts of powdered glass were produced. It is a further object of this invention to prevent these objectionable results.

A further object of the invention is to maintain the bottles in the channel in spaced relation and to prevent contact of the descending bottles in the channel from engagement with metal surfaces.

To prevent the jamming which has been referred to above, and to prevent wear of the bottles in the channel, I provide in the channel a conveyer having abutment means which become located between successive bottles so at to hold them apart. This conveyer is located in parallel relation to the closed gates so that it constitutes with these gates the effective verical channel for the bottles. The abutment means are located so that the position of each bottle in the vertical channel is parallel to its original position on the shelves. In normal condition, each bottle in the channel rests against the closed gates and is supported by abutment means on the conveyer. In case a bottle jams with a slightly opened gate due to the pressure of the bottles on the shelf which that gate restrains, the next upper abutment means engages the jammed bottle and forcibly moves it down the vertical channel. It will be understood that in each dispensing operation, the conveyer is moved downwardly so that the bottles are moved down one space in the vertical channel and the lowermost bottle is dispensed. The abutment means are preferably of rubber-like material or are covered with such material. A bottle in the channel is normally supported on the abutment means and rests against the closed gate. Strips of rubber or rubber-like material on the gates keep the bottles out of metallic engagement in the channel.

A further object of the invention is to render the machine adaptable for bottles of different diameters, and for this purpose I provide relative adjustment between the conveyer and the assembly of shelves.

The conveyer may suitably be constituted by two endless chains carrying projections at appropriate positions. These chains are driven simultaneously and are so arranged that the downwardly moving lengths thereof are in position to cooperate with the bottles, the upwardly moving lengths of the chains being remote therefrom. Suitable means, such as a vertical rod is located so as to engage the bases of the bottles moving down the vertical channel.

A further object of the invention is to provide an improved delivery mechanism for receiving a bottle from the conveyer and delivering it to the customer.

A further object of the invention is to provide an improved merchandising machine which is rendered inoperative when a discharged bottle is not removed by the customer.

Other objects, advantages, and capabilities of the invention will appear in the following description of a preferred embodiment thereof taken in conjunction with the accompanying drawings in which, Fig. 1 is a fragmentary sectional elevation of a machine embodying my invention, the front of the machine being on the left;

Fig. 4 is a fragmentary sectional plan view showing the conveyer and an associated shelf, the section being taken on the broken line 4—4 of Fig. 1;

Fig. 5 is a fragmentary perspective view of the underside of a shelf showing the manner in which a gate is mounted thereon;

Fig. 6 is a fragmentary elevational view showing the lowermost shelf and mechanism associated therewith;

Fig. 7 is a fragmentary elevational view of the conveyer actuating mechanism, this mechanism being in normal position;

Fig. 8 is a similar view showing the mechanism at an intermediate position in its operation;

Fig. 9 is a fragmentary plan view showing the discharge cradle in full lines in its normal position and in phantom in its discharging position;

Fig. 10 is a fragmentary front elevational view of the discharge opening and associated parts;

Fig. 12 is a front elevational view of the coin controlled mechanism;

Figure 1:
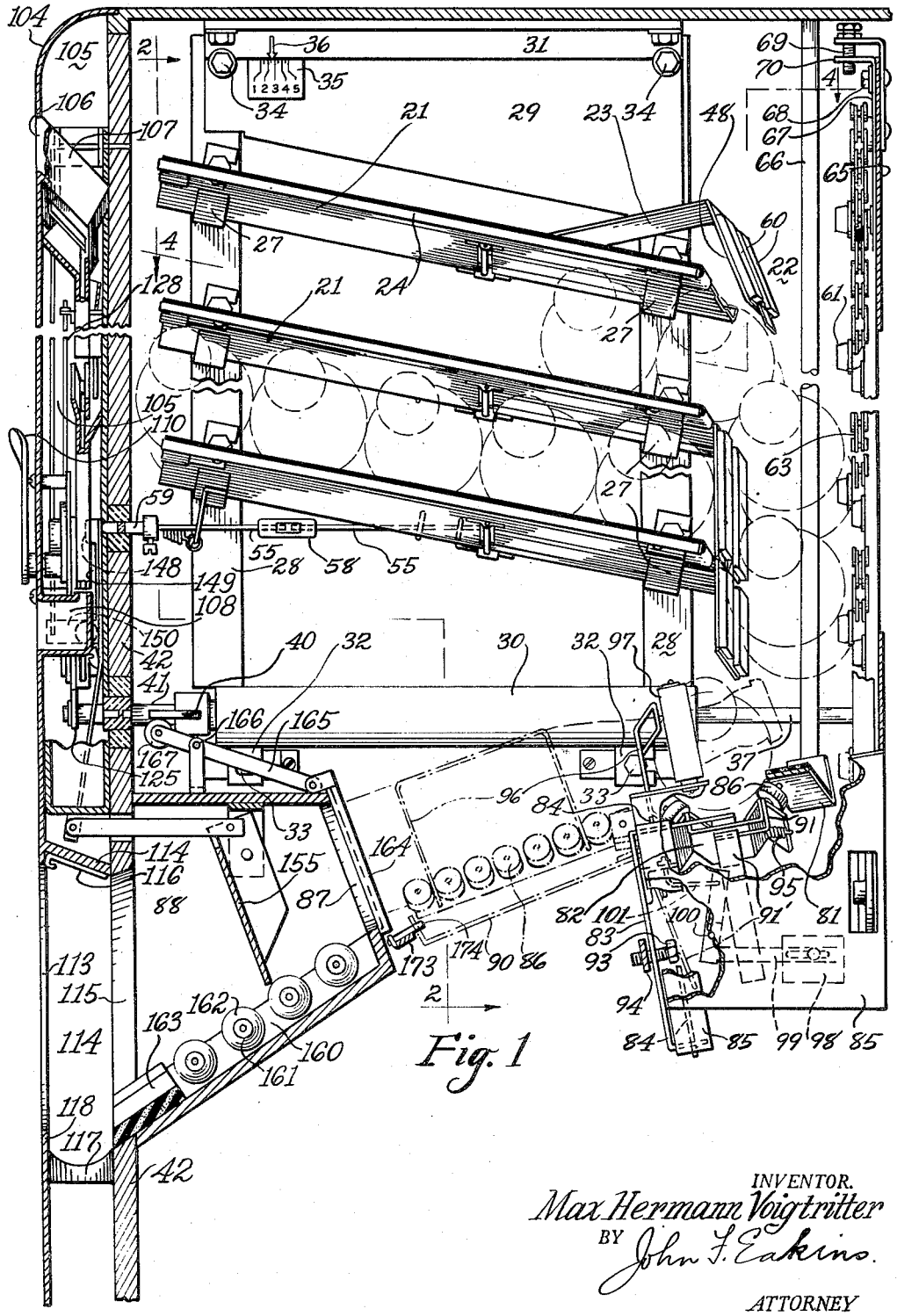

Referring to the drawings reference numeral 20 designates the cabinet as a whole. The bottles are stored within the cabinet upon a series of sloping shelves 21 and in a vertical channel 22 into which the bottles are delivered from the shelves. Upon each shelf is mounted a gate 23 which normally prevents the egress of bottles from the next shelf below. This gate is arranged to be held closed by a bottle on the shelf which carries the gate or by a bottle in the vertical channel 22 opposite the gate. The bottles are discharged one by one from the bottom of the channel 22 and it will readily be appreciated from Fig. 1 that as the bottles move down one by one in the channel 22 the bottles roll from the top shelf 21 one by one into the channel 22 and when the last bottle from the topmost shelf 21 clears the topmost gate 23 this gate opens and the bottles are then fed one by one from the second shelf 21 into the channel 22 and so forth until all the bottles have been dispensed. Each shelf 21 comprises a main web, a downwardly turned outer flange 24 and an up turned lateral flange 25 which serves as an abutment for the bases of the bottles. The shelf 21 slopes downwardly towards the channel 22 and it also slopes downwardly from the flange 24 to the flange 25 so that the bottles tend by gravity to bear against the flange 25 and to roll towards the vertical channel 22. I find that there is a tendency for the shoulders of the bottles to move faster than their bases. I find that this tendency is obviated to a great extent by applying to the top surfaces of the shelves 21 adjacent the flanges 24, strips 26 of rubber or other material having greater friction than the metal of which the shelves are formed. I find it to be of advantage to arrange the bottles slightly oblique to the transverse direction of the shelf 21 as shown in Fig. 4. Consequently I arrange the elements which constitute the channel 22, which will hereinafter be more fully described with the desired obliquity.

Each shelf 21 is mounted by means of angle arms 27 on two vertical channel members 28. These channels are connected rigidly by a plate 29 and a housing 30 to constitute a single rigid frame. The plate 29 has a flange at its upper end which is received in the recess in a channel 31 secured to the upper end of the cabinet. The lower end of the frame carries slotted lugs 32 which are secured to the side of the cabinet by screws 33. The upper end of the frame carries screws 34 which secure the frame to the channel member 31 with the aid of washers. It will readily be understood that if the screws 33 and 34 are loosened the frame can be adjusted to the left or right as viewed in Fig. 1 so that the vertical channel 22 may be adjusted any width for the reception of bottles of different sizes. A scale 35 on the plate 29 cooperates with an arrow 36 on the channel member 31 to indicate the setting of the frame.

Figure 3:
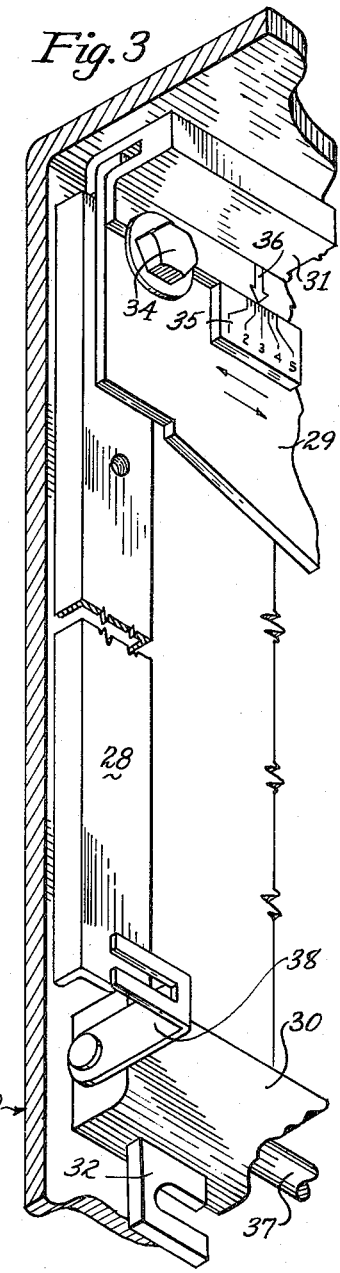
Fig. 3 is a perspective view showing the shelf carrying frame and the manner in which it is adjustably mounted on the cabinet.
Figure 11:
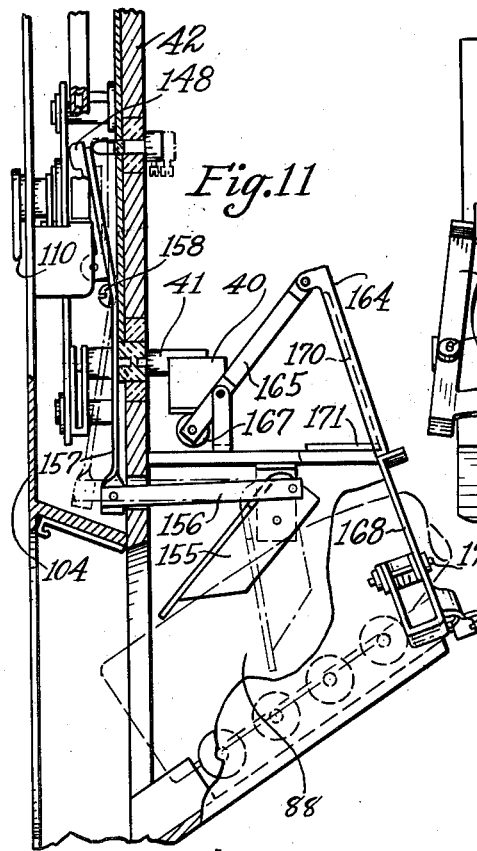
Fig. 11 is a fragmentary sectional elevation showing mechanism associated with the discharge chamber in actuated condition.

The housing 30 rotatably supports a shaft 37 which rigidly carries arms 38 and 39. The end of the arm 38 is turned outwardly and is slotted as shown in Fig. 3 so as to receive a flat arm 40 projecting radially from an actuating shaft 41 carried by the door 42 (Fig. 11). In the normal condition of the mechanism the arm 40 and the arm 38 are horizontal so that the arm 40 moves into the slot in the arm 38 freely when the door is closed. The slotted arm 39 is arranged to cooperate with a pin 43 carried by a rocking member 44. The pin 43 is relatively long so that it remains engaged with the arm 39 in all positions of the bottle carrying frame.

Each shelf 21 is provided with a transverse opening 45 in which the gate 23 carried by it is pivotally mounted. Beyond the opening 45 the main web of the shelf 21 is dished downwardly at 46 to provide a recess in which the web 47 of the gate 23 seats. At its extremity remote from the downwardly turned web 48 of the gate, the web 47 has secured thereto a flat element 49 having two trunnions at its end. One of these trunnions has a bearing in the strap 50 secured to the underside of the shelf 21. The other has a bearing in a plate 51 mounted on a bracket 52 by screws 51' mounted on the rear side of the flange 25. The plate 51 is shown in phantom in Fig. 5. The flat element 49 carries an upwardly directed arm 53 which is connected to a spring 54. The arrangement is such that the spring 54 biasses the gate 23 to upward or open position as shown on the top shelf of Fig. 1.

As shown in Fig. 6 the lowermost shelf 21 has associated therewith a rod 55 which is guided in openings in the bracket 52 and in a bracket 56 so that it extends in a horizontal direction towards the door and is arranged to abut against the arm 53. The rod 55 is biassed towards the arm 53 by a weak spring 57. The rod 55 comprises two portions connected together by a turn buckle 58 so that its effective length may be varied in accordance with the adjustment of the bottle carrying frame to the left or right as viewed in Fig. 1. The outer end of the rod 55 engages an abutment 59 mounted on the door 42. When the lowermost gate is closed the rod 55 has the position shown in Fig. 1. When the last bottle in the machine clears the lowermost gate the gate opens and the rod 55 displaces the abutment 59 to the left as shown in Fig. 6.

Figure 2:
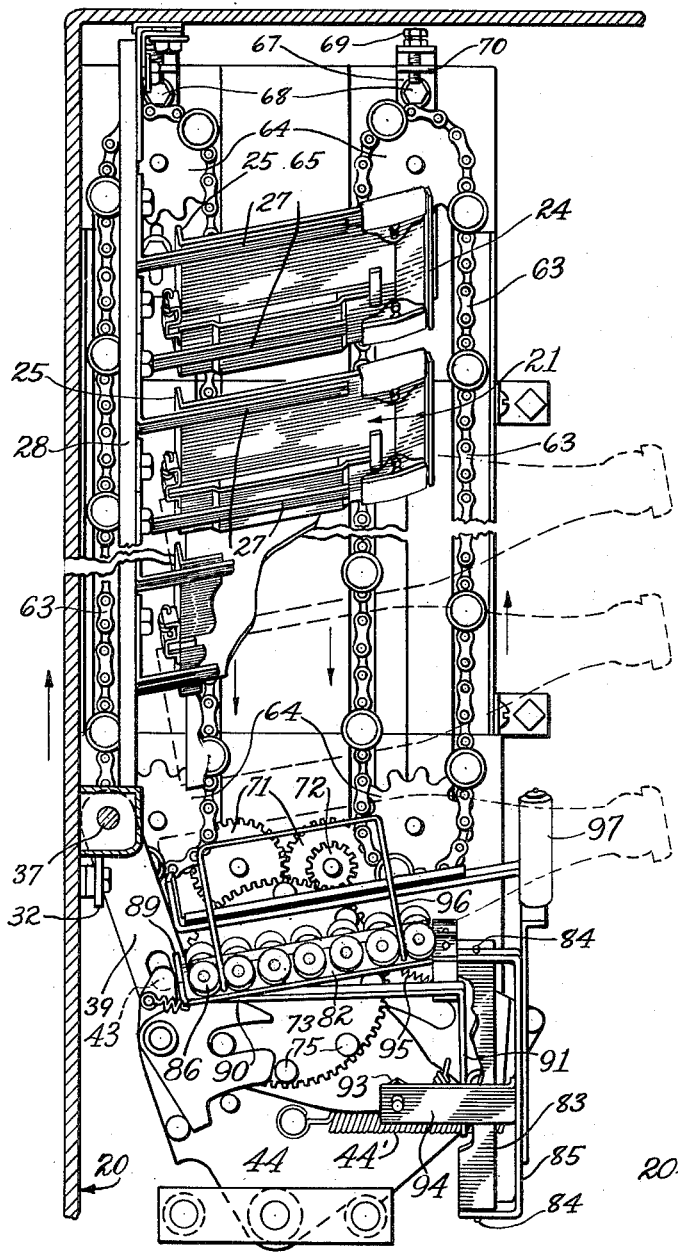
Fig. 2 is a fragmentary sectional elevation of the machine as viewed from the front, the section being taken on the broken line 2—2 of Fig. 1.

The gate 23 is preferably formed of a piece of stock which is bent to provide the webs 47 and 48. The exterior of the web 48 is preferably provided with strips 60 of rubber or other suitable material against which the bottles in the vertical channel 22 bear. The bottles are supported in the vertical channel 22 by means of the strips 60 and by means of projections 61 carried by two endless chains 63, which are best shown in Fig. 2. These chains are mounted vertically by means of sprocket wheels 64 which are carried by a frame 65 mounted in the rear of the cabinet. The chains are driven in opposite directions so that their adjacent lengths move downwardly. The projections 61 on the adjacent lengths of the chains support the bottles, the projections on the remote upwardly moving lengths being out of contact with the bottles as best seen in Fig. 4. The bottles are held in proper position in the vertical channel 22 by means of a vertical rod 66 which is arranged to engage the bases of the bottles. The projections 61 are arranged so that they support the bottles in the inclined position which they had when resting on the shelves 21, this inclination being preferably around 10°. The upper sprocket wheels 64 are mounted on plates 67 which are slotted to receive machine screws 68. The tension of the chains 63 may be adjusted by releasing the machine screws 68 and actuating machine screws 69 supported on lugs on the frame 65 and threaded into lugs 70 on the plates 67.

The lower sprocket wheels 64 rigidly carry pinions (not shown) which mesh with intermeshing pinions 71. One of the pinions 71 rigidly carries a pinion 72 which meshes with a gear 73. During the dispensing operations the arm 39 is rotated in clockwise direction as viewed in Fig. 7 into its position in Fig. 8 and then it is moved back to bring the arm 39 into its normal position of Fig. 7 rocking the rocking member 44. In normal position the recess of a dog 74 engages one of a series of pins 75 on the gear 73. During the first movement of the arm 39 the dog 74 is withdrawn from that pin and the recess of a dog 76 engages another pin 75 rotating the gear 73 half a step in the counter-clockwise direction. After the engaged pin 75 is nested in the recess of the dog 76 the dog must move in clockwise direction relatively to the rocking member 44 since it must follow the circular movement which is the only movement available for the engaged pin. During the next movement of the rocking member 44 into its position in Fig. 7 the dog 76 is withdrawn from the engaged pin 75 and it is moved in counterclockwise direction relative to the rocking member 44 by a spring 77 into its normal position on the rocking member 44. This position is defined by the engagement of the tail on the dog against an abutment 78. At the end of the first movement the dog 74 is positioned by its spring 79 against an abutment 80 so that the U formation of the dog 74 is opposite the next pin 75 in the clockwise direction. Consequently the dog 74 engages this next pin and moves the gear 73 another half step in the counterclockwise direction and the double movement of the arm 39 has thus moved the adjacent lengths of the chains 63 down one spacing of the bottles in the vertical channel 22. Thus the lowest bottle in the vertical channel 22 has been carried past the lowermost gate so that it drops freely on to a guide 81 which directs it on to a cradle 82. As the bottles in the vertical channel 22 move downward during successive dispensing operations the bottles are fed from the discharging shelf, for example, the second shelf in Fig. 1 and when all the bottles are discharged from the shelf and the bottles in the vertical channel 22 clear the topmost closed gate, that gate opens and the bottles are discharged successively from the next shelf. When the last bottle is dispensed the gate on the lowermost shelf moves upwardly and the rod 55 is moved to the left as viewed in Fig. 1 with results which will hereinafter be described.

The cradle 82 is integral with a frame 83 which is pivoted at 84 to a stationary frame 85. The axis 84 is displaced forwardly from the vertical approximately 10° as shown in Fig. 1. As shown in Fig. 2 the cradle 82 normally extends downwardly approximately 10° from the horizontal so that it is parallel to the discharging bottle. After the cradle receives this bottle it swings forwardly by gravity through 90° in its inclined plane so that it is located at an angle of approximately 20° to the horizontal at the end of the swing as shown in phantom in Fig. 1. The cradle is equipped with two series of rollers 86 so that the bottle is free to slide down through the discharge opening 87 into the discharge chamber 88.

I have previously referred to the oblique relation to the bottles relative to the shelf 21, as shown in Fig. 4. This oblique relation is attained by locating the gate 23 in a similar oblique relation so that they make a slightly acute angle with the lower side of the shelf 21 as is best seen in Fig. 4. The conveyer elements 61 which cooperate with the gates 23 to define the vertical channel 22, are located in similar oblique relation. It will be understood that when a bottle is freed to roll down its shelf 21, the friction strip 26 causes the bottle to roll down rather than to slide down. In this rolling movement the bottle tends to roll away from the flange 25 and the weight of the bottle tends to slide it axially into engagement with the flange 25. This effect substantially reduces the friction at the base of the bottle during rolling.

When the bottle drops on to the cradle its base engages an upturned latch 89 which normally projects upwardly beyond the free end of the cradle 82. The latch 89 is carried by a frame 90 which is located below the cradle 82 and is pivotally mounted on the cradle by means of a lug 91. The pivoted frame 90 includes a downwardly extending arm 91' which is arranged to engage an adjustable abutment 93 carried by a bracket 94, when the cradle has completed its swing into its phantom position in Fig. 1. This engagement swings the frame 90 in the counterclockwise direction as viewed in that figure so that the bottle is free to roll off the cradle into the discharge chamber 88. The frame 90 is biassed into its normal position by spring 95 so that when the cradle moves away from its discharging position the latch 89 is again moved upwardly. In order to prevent the bottle from rolling off the normally low side of the cradle 82 I provide on that side of the cradle a fence 96 and I also provide a rubber covered roller 97 on the frame 85 to engage the upper end of the discharging bottle.

The cradle 82 is biassed into its receiving position by means of a weight 98 which is carried on one arm of a bell crank lever 99 which is pivoted at 100 on the frame 85. The upwardly directed arm of the lever 99 is connected by a link 101 to the frame 83 which carries the cradle.

The size of the weight 98 is selected so that a bottle of any commercial size will carry the cradle from its normal to its discharging position. The weight 98 may be adjusted on the lever 99 to accommodate the machine to bottles of practically any weight. Stops 102 and 103, preferably of rubber define the extreme positions of the cradle 82.

Figure 13:
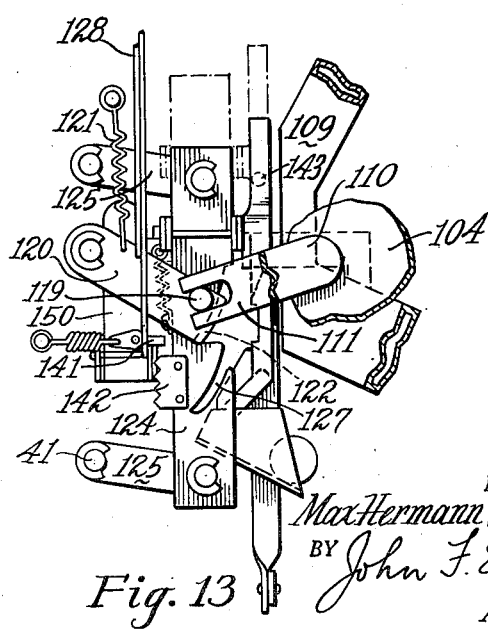
Fig. 13 is a similar view showing this mechanism in actuated condition.

The door 42 like the walls of the cabinet is well insulated, the interior of the cabinet being chilled by a refrigerating unit, not shown. On the outer side of the door 42 is provided another door 104, arranged to provide a space 105 for the accommodation of the mechanism which will hereinafter be described. The outer door 104 carries a coin slot 106 and a coin chute 107 which delivers a coin to a slug rejecting mechanism (not shown) which returns a slug to the return cup 108, also carried by the outer door 104. An accepted coin is delivered by the chute 109, as shown in Fig. 12. The outer door 104 also pivotally supports an actuating handle 110 which is rigidly connected to a bifurcated arm 111 located on the inside of the door 104 (Fig. 13). The door 104 is provided with an opening 112 adjacent the coin slot 106. The outer door 104 is provided with a discharge opening 113 in alignment with the discharge chamber 88, which is carried by the door 42. On the inner side the door 104 carries a collar 114 which normally abuts against the door 42, around the discharge opening 115 in the door 42. At its upper end the collar 114 carries an inwardly hooked member 116 for removing crown seals from the discharged bottles. At its lower end the collar 114 is provided with an opening 117 so that the removed crown seals may drop downwardly into a suitable receptacle (not shown). As best seen in Fig. 1 the lower end of the opening 113 projects upwardly above the lower end of the collar 114 so as to provide a projecting flange 118 against which the base of the discharged bottle may rest ready for the customer to pick it up.

When the doors are closed the forked end of the arm 111 embraces a pin 119 carried by an arm 120 which is pivotally mounted on the door 42. This arm is normally biased upwardly by a spring 121 so that its inwardly directed flange 122 abuts against a surface 123 on a bar 124 as shown in Fig. 12. The bar 124 is supported by a pair of parallel links 125 and it is biased into its normal position shown in Fig. 12 by a spring 126. The lower link 125 is rigidly secured to the actuating shaft 41 which is pivotally mounted on the door 42 so that the downward movement of the bar 124 effects the discharge of a bottle in the manner previously described. The bar 124 is provided with an arcuate opening 127 in the normal path of the arcuate flange 122 so that actuation of the handle 110 without the introduction of a coin does not actuate the bar 124 and does not effect the discharge of a bottle. An upwardly extending link 128 is connected to the arm 120 and to the slug rejecting mechanism (not shown) for the purpose of actuating the scavenger of such mechanism to release magnetic slugs which may be retained therein. This scavenger consequently operates on every actuation of the handle 110.

Figure 14:
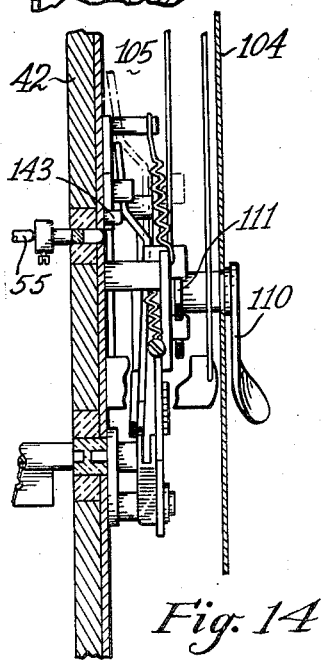
Fig. 14 is a fragmentary side elevational view showing this mechanism in actuated condition.

The accepted coin passing through the chute 109 is delivered to a coin nest constituted by the bar 124, a parallel spaced flange 134, an inclined strip 130, a flange 131 and a shoulder 133. The flange 134 and the shoulder 133 are provided by a bracket 132 secured to the rear side of the bar 124. The flange 131 extends upwardly from the rear side of the strip 130 which is carried on the rear side and at the lower end of a lever 129. The lever 129 is integral with lugs 136 whereby it is pivoted on lugs extending forwardly from the bar 124, by means of a pin 137. A coin being delivered by the chute 109 to the bar 124, passes between the lever 129 and the flange 131 onto the strip 130 and into engagement with the shoulder 133. When received in its nest, one side of the coin is restrained by parts of the bar 124 on either side of its slot 127. The other side of the coin is restrained by the flanges 134 and 131. A spring 138 biases the lower end of the lever 129 forwardly so that its strip 130 normally engages the rear face of the bar 124. At the upper end of the slot 127 the bar 124 is provided with a recess 139 which provides a surface 140 which is substantially in alignment with the upper edge of a coin supported on the bar 124 as shown in Fig. 12. With a coin in this position actuation of the handle 110 swings the arm 120 downwardly so that its flange 122 engages the top edge of the coin. The bar 124 is moved downwardly carrying the lever 129 with it. The arcuate movement of the flange 122 causes it to enter the recess 139 and engage the surface 140 after a very slight downward movement of the bar 124. Continued downward movement of the flange 122 moves the bar 124 downwardly to its full extent by engagement of the flange 122 with the surface 140. A full stroke mechanism comprising a spring pressed dog 141 and a toothed member 142 carried by the bar 124 compels complete actuation of the handle 110 to effect the first displacement of the gear 73. The handle 110 may now be released and the strong spring 44' returns the rocking member 44 to its normal position (Figs. 2 and 7), discharging a bottle to the cradle 82 and returning the handle 110 to initial position. Complete return of the handle 110 is necessary for such discharge of a bottle. The upper end of the lever 129 is bent rearwardly so that it engages a fixed abutment 143 carried by the door 42 so that the lower end of the bar 129 is swung rearwardly after the bar 124 has moved down part of its stroke (Fig. 14). The strip 130 is thus withdrawn from the coin so that it falls downwardly into a small chute 145 carried by the bar 124 so that the coin is delivered into a coin box 146 which may be removably supported on the door 42. In the event that a second coin is inserted before the handle 110 is actuated the second coin engages the first coin and the upper end of the strip 130 in such manner that the second coin rolls to the right as viewed in Fig. 12 and is delivered by the chute 147 to the return cup 108.

In the event that the machine is empty a genuine coin is also returned to the cup 108 through the chute 147 by means of a projection 148. This projection is carried at the end of a lever 149 pivotally mounted on the door 42 and is biased towards the door 42 by means of a spring 159. When the lever 149 is in its normal position the projection 148 is clear of the bar 129 but when it is swung forwardly the projection closes the slot between the bar 129 and the bar 131 so that an incoming coin is engaged by the projection 148 and is directed into the coin chute 147. When the machine is empty the rod 55 is displaced to the left as viewed in Fig. 1 and the abutment 59 mounted in the door 42 is likewise displaced to the left. The abutment 59 engages the upper arm of a bell crank lever 150 which is pivoted on the door 42 so that the bell crank lever is swung in counterclockwise direction as viewed in Fig. 1 when the machine becomes empty. The upwardly directed arm of the lever 150 carries a lateral extension 151 which is located behind the lever 149. Consequently when the machine becomes empty both levers 150 and 149 are swung in the same direction and the projection 148 is moved into coin returning position. The horizontal arm of the lever 150 is connected by a link 152 to a flag lever 153 which is pivotally mounted on the door 42 adjacent the window 112. The flag lever is biased towards its normal position by means of a spring 154 which holds the lever 150 against the abutment 59. In its normal position the flag lever 153 holds suitable indicia in register with the window 112. As shown in Fig. 12 this indicia may indicate the coin which should be used to purchase a bottle. When the machine becomes empty and the lever 150 is actuated by the abutment 59 the flag lever 153 is displaced so as to bring the word "Empty" into alignment with the window 112, and the lever 150 displaces the lever 149 forwardly bringing the projection 148 into coin rejecting position.

It is undesirable to discharge a second bottle while a bottle is located in the discharge chamber 88. To prevent actuation of the discharge mechanism while a bottle remains in the discharge chamber 88 I provide within this chamber a pivoted flap 155 which is swung in clockwise direction by a discharging bottle as shown in Fig. 11. The flap 155 is connected by a link 156 to a lever 157 pivotally mounted on the front of the door 42 by means of a screw 158. The upper end of the lever 157 extends behind the lever 149 so that when the lever 157 is swung by a bottle in the discharge chamber 88 the abutment 148 again blocks the slot between the bars 129 and 131 so that coins are returned to the return cup 108 until after the discharged bottle is picked up out of the discharge chamber 88.

The discharge chamber 88 is in the general form of a frusto-conical chamber which extends inwardly from the door 42 around the discharge opening 115 in the door 42. Along its lower downwardly sloping side the discharge chamber 88 is provided with two rails 160 which are in spaced relation. A number of horizontal spindles 161 are rotatably carried by the rails 160. Each spindle 161 carries two conical rubber rollers 162 to serve as a conveyer for the descending bottle, the apices of the rollers 162 being directed towards the center so that they provide a concave seat for the bottle. At its outer end below the rollers 162 the discharge chamber 88 is provided with a block 163 of sponge rubber which is U-shaped. This block engages the discharging bottle as it passes over the rollers 161 and applies braking friction to the bottle which substantially reduces its impact against the stop 118.

Figure 15:
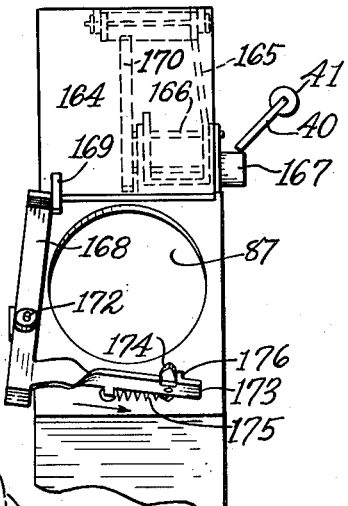
Fig. 15 is a fragmentary elevational view showing the discharge chamber and associated mechanism as viewed from the inner side of the discharge chamber.

To prevent escape of cold air from the cabinet, I provide a door or flap 164 which closes the opening 87 except when a bottle is being discharged. This door is arranged to be moved upwardly by means of a pivoted lever 165 connected to its upper end. This lever is pivotally mounted at 166 and its end remote from the door 164 carries a roller 167 which is adapted to be engaged and actuated by the flat arm 40 when the arm 110 rotates the actuating shaft 41 so that the door 164 is elevated into its position shown in Figs. 11 and 15. The bell crank lever 168 is normally biased by its weight against a side of the door 164. When the door 164 is elevated the bell crank lever swings into its position in Fig. 15 so that its upper end holds the door open. An abutment 169 on the door limits the latching movement of the lever 168. The door 164 may be guided in any suitable manner. It is preferred to provide it with an axial slot 170 which receives a projection 171 carried on the upper side of the discharge chamber 88. Bell crank lever 168 is pivoted at 172 so that its generally horizontal arm 173 extends across and below the opening 87. The arm 173 pivotally carries a dog 174 which is biased by a weak spring 175 against an abutment 176 on the arm 173. The dog 174 is arranged to be engaged by the latch 89 as cradle 82 swings to its bottle discharging position. This engagement merely swings the dog 174 against the action of its spring 175. When the bottle rolls off the cradle 82 the cradle returns to its normal position under the action of the weight 98. During the return movement of the cradle the latch 89 engages the left hand side of the dog 174 as viewed in Fig. 15 so that the bell crank lever 168 is swung into unlatching position whereupon the door 164 moves downwardly into its normal position.

In loading the machine a bottle is inserted over the lowermost shelf so that the lowermost gate is moved downwardly. This first bottle is brought into engagement with two abutments 61 on the conveyer chains 63 so that this bottle holds the lowermost gate down. The next bottle is moved in over the second shelf from the bottom in similar fashion until it rests on the next two abutments 61 and holds the gate for the lowermost shelf closed. This operation is continued until all the gates are closed and the channel is filled with bottles. The remainder of the bottles are placed on the shelves and those bottles on all the shelves except the uppermost shelf are restrained by the closed gates. The doors are then closed and locked and the machine is ready for use. It is to be noted that the bottles in the vertical channel are normally engaged by a pair of abutments 61 and by the strip 60 on the gate. Their bases engage the rod 66. Since the bottles in the channel are in spaced relation, their downward movement in the channel is not accompanied by any abrasive action on the bottles.

The customer inserts a coin in the coin chute 106. This coin becomes seated in the coin nest as shown in Fig. 12. The customer now actuates the handle 110 which brings the flange 122 of the arm 129 into engagement with the coin and the bar 124 is moved downwardly. After a slight movement of the bar 124 the flange 122 engages the surface 140 on the bar 124 so that this bar is moved downwardly into its position in Fig. 13. After the toothed member 142 on the bar 124 has been engaged by the dog 141 so as to compel complete actuation of the handle 110, the lever 129 is swung by the abutment 143 so that the strip 130 is swung away from the coin, permitting the coin to drop onto the small chute 145 which delivers it to the coin box 146. The actuation of the handle 110 swings the rocking member 44 from its position in Fig. 7 into its position in Fig. 8, moving the conveyer chains downwardly half a step. The bottles in the channel are moved down half a step but the lowermost bottle still remains in the channel. The handle 110 is now released and the spring 44' rocks the rocking member 44 back to its initial position in Fig. 7 and the bottles in the channel are moved down another half step. The lowermost bottle in the channel is now free to roll over the guide 81 and on to the cradle 82. Its base engages the latch 89. Owing to the weight of the bottle, the cradle 82 swings about its pivot so that the bottle is directed downwardly towards the opening 87 and the latch 89 is depressed so as to release the bottle on the cradle so that it can slide downwardly through the discharge opening 87 into the discharge chamber 88. The discharged bottle rolls over the rollers 162 and over the friction block 163. This block acts as a brake slowing the movement of the bottle so that its base engages the flange 118 with a very gentle impact. It may be noted that in the case of carbonated beverages it is desirable to avoid agitation of the contents of the bottle.

When the handle 110 was actuated, the arm 40 opened the gate 164 before the discharging bottle was delivered to the cradle 82. This gate was latched open by the lever 168 so that the bottle was free to move through the opening 87. In swinging downwardly, the flange 89 of the cradle 82 passed the dog 174. After the bottle slides downwardly off the cradle 82 the cradle is free to return to its normal position under the influence of the weight 98. When the cradle is thus moved back to its normal position, the latch 89 engages the dog 174 swinging the latch lever 168 away from the gate 164 so that this gate is free to return to its normal position, closing the opening 87 when the discharged bottle is picked up out of the discharge chamber 88. When the bottle enters the discharge chamber 88 it swings the flap 155 so that the upper end of the lever 157 is swung forwardly projecting the flange 148 into the path of another coin which may be inserted into the coin chute 106. The flange 148 returns the coin to the cup 108 and the machine is rendered inoperative until the discharged bottle is lifted out of the discharge chamber 88.

When the bottles in the vertical channel are moved downwardly half a step at a time another bottle rolls from the uppermost shelf into the channel in two half steps. This bottle is received by the next two effective abutments at the upper end of the channel so that the channel is always replenished as bottles are discharged from its lower end. The bottles on the shelves maintain the gates closed. When the last bottle on the upper shelf rolls off the web 47 of the uppermost gate, the weight of the bottles in the second shelf tends to open the uppermost gate. This tendency is opposed by the bottle last discharged from the uppermost shelf which bottle becomes located opposite this gate. Should the gate apply sufficient pressure to the last discharged bottle from the uppermost shelf to impede the free descent of this bottle during the next dispensing operation, the two abutments 61 above this bottle engage its upper side forcibly moving the bottle downwardly clear of the uppermost gate. This gate is now free to open so that the bottles are discharged from the second shelf into the channel as bottles are discharged from its lower end. This operation continues until all the bottles are discharged from all the shelves and dispensed. When the last bottle clears the lowermost gate and is dispensed to the cradle 82 this gate moves upwardly and its rod forces the abutment 59 outwardly swinging the lever 150 to bring the word "Empty" on the lever 153 into register with the opening 112. This movement of the lever 150 carries the lever 149 forwardly so that the flange 148 is brought into coin returning position. The machine is now out of operation until the supply of bottles is replenished.

Although the invention has been described in connection with the specific details of a preferred embodiment thereof, it must be understood that such details are not intended to be limitative of the invention except in so far as set forth in the accompanying claims.

Having thus described my invention, I declare that what I claim is:

1. A dispensing mechanism for round articles comprising plurality of spaced superimposed shelves for said articles, a vertical discharge channel for said articles, said shelves sloping downwardly towards said channel whereby said articles tend to roll into said channel, a gate at the end of each shelf arranged to be held closed by the articles in the channel and arranged to open when the portion of the channel opposite the gate is free of articles whereby the articles previously restrained by the gate are free to roll into the channel as articles are removed therefrom, conveyer means in said channel in parallel spaced relation to the closed gates, said shelves being sloped also in their transverse direction, and an abutment along the low side of each shelf against which the articles tend to abut, said conveyor means and said gates being located with a slight obliquity to the transverse direction of the shelves and making a slightly acute angle with the low sides of the shelves, so as to locate the articles on the shelves with similar obliquity whereby the articles tend to roll down the shelves and away from their abutments and tend to slide transversely into engagement with the abutments, thereby substantially reducing the friction between the articles and the abutments while the articles are rolling down the shelves.

2. A dispensing mechanism for round articles comprising a plurality of spaced superimposed shelves for said articles, a vertical discharge channel for said articles, said shelves sloping downwardly towards said channel whereby said articles tend to roll into said channel, a gate at the end of each shelf arranged to be held closed by the articles in the channel and arranged to open when the portion of the channel opposite the gate is free of articles whereby the articles previously restrained by the gate are free to roll into the channel as articles are removed therefrom, conveyer means in said channel in parallel spaced relation to the closed gates, said shelves being sloped also in their transverse direction, an abutment along the low side of each shelf against which the articles tend to abut, a strip of friction material along the upper edge of each shelf to cause the articles to roll down the shelf, said gates being located with a slight obliquity to the transverse direction of the shelves and making a slightly acute angle with the low sides of the shelves so as to locate the articles on the shelves with similar obliquity, whereby the articles tend to roll down the shelves and away from their abutments and tend to slide transversely into engagement with the abutments, thereby substantially reducing the friction between the articles and the abutment while the articles are rolling down the shelves.

3. In a dispensing mechanism, a shelf assembly comprising a plurality of spaced superimposed shelves, said shelves sloping downwardly in their longitudinal direction and in their transverse direction, an upturned flange along the lower side of each shelf, and a gate pivotally carried by each shelf to retain articles on the next lower shelf, each gate being slightly oblique to the transverse direction of the shelf and forming a slightly acute angle with the lower side of the shelf.

4. In a dispensing mechanism, a shelf assembly comprising a plurality of spaced superimposed shelves, said shelves sloping downwardly in their longitudinal direction, and in their transverse direction, an upturned flange along the lower side of each shelf, a friction strip along the upper side of each shelf, and a gate pivotally carried by each shelf to retain articles on the next lower shelf, each gate being slightly oblique to the transverse direction of the shelves and forming a slightly acute angle with the lower side of the shelf.

MAX HERMANN VOIGTRITTER.

REFERENCES CITED

The following references are of record in the file of this patent:

UNITED STATES PATENTS

| Number | Name | Date |
| --- | --- | --- |
| 733,584 | Hoffmann | July 14, 1903 |
| 814,712 | Leighton | Mar. 13, 1906 |
| 1,149,377 | Loveren | Aug. 10, 1915 |
| 1,240,321 | Dickinson | Sept. 18, 1917 |
| 1,451,216 | Gruetter | Apr. 10, 1923 |
| 1,655,090 | Cunningham | Jan. 3, 1928 |
| 1,803,146 | Robbins | Apr. 28, 1931 |
| 1,893,708 | Kauffman et al. | Jan. 10, 1933 |
| 1,897,072 | Parks et al. | Feb. 14, 1933 |
| 1,931,159 | Greene | Oct. 17, 1933 |
| 2,002,753 | Parks | May 28, 1935 |
| 2,005,092 | Kuhn | June 18, 1935 |
| 2,058,637 | Scott et al. | Oct. 27, 1936 |
| 2,178,001 | Siehrs | Oct. 31, 1939 |
| 2,189,740 | Mills | Feb. 6, 1940 |
| 2,296,444 | Kohl et al. | Sept. 22, 1942 |
| 2,313,424 | Esgro | Mar. 9, 1943 |
| 2,326,504 | Smith | Aug. 10, 1943 |
| 2,336,382 | Albrecht | Dec. 7, 1943 |
| 2,338,714 | Garner | Jan. 11, 1944 |
| 2,358,563 | Donaldson | Sept. 19, 1944 |
| 2,360,241 | Kuhl | Oct. 10, 1944 |
| 2,393,370 | Hamilton | Jan. 22, 1946 |